US008470067B2

(12) United States Patent
Nguyên et al.

(10) Patent No.: US 8,470,067 B2
(45) Date of Patent: Jun. 25, 2013

(54) PROCESS FOR PREPARING A FOAMING SLAG FORMER, PRODUCT AND USE THEREOF

(75) Inventors: Evelyne Nguyên, Sint-Lambrechts-Woluwe (BE); Dirk Van Mechelen, Tisselt (BE); Philippe Descamps, Ham-sur-Heure (BE)

(73) Assignee: Recoval Belgium, Farciennes (BE)

( * ) Notice: Subject to any disclaimer, the term of this patent is extended or adjusted under 35 U.S.C. 154(b) by 0 days.

(21) Appl. No.: 12/812,927

(22) PCT Filed: Jan. 15, 2009

(86) PCT No.: PCT/EP2009/050445
§ 371 (c)(1),
(2), (4) Date: Oct. 13, 2010

(87) PCT Pub. No.: WO2009/090226
PCT Pub. Date: Jul. 23, 2009

(65) Prior Publication Data
US 2011/0023659 A1 Feb. 3, 2011

(30) Foreign Application Priority Data

Jan. 15, 2008 (EP) .................. PCT/EP2008/050412

(51) Int. Cl.
*C21B 13/12* (2006.01)
*C03B 19/08* (2006.01)

(52) U.S. Cl.
USPC .................. 75/313; 75/10.46; 75/770; 65/20

(58) Field of Classification Search
USPC .............................. 75/770, 313, 10.46; 65/20
See application file for complete search history.

(56) References Cited

U.S. PATENT DOCUMENTS

2007/0051200 A1 * 3/2007 Vayda .............................. 75/327
2011/0154946 A1 * 6/2011 Amirzadeh-Asl et al. ... 75/10.47

FOREIGN PATENT DOCUMENTS

| EP | 0655508 A1 * | 5/1995 |
| FR | 2634787 A1 * | 2/1990 |
| JP | 56058913 | 5/1981 |
| JP | 2003126827 | 5/2003 |
| JP | 2007022817 | 2/2007 |

OTHER PUBLICATIONS

Machine translation FR 2634787, published Feb. 1990.*
Machine translation JP 2003-126827, published May 2003.*
International Search Report and Written Opinion, PCT/EP2009/050445, Mar. 12, 2010.
Kara Metal Complex , "Slag Mixture for Casting Steel", Database WPI Week 197806, Thomson Scientific, AN 1978-11801A, Apr. 15, 1977.
Rawlins, et al., "Steelmaking Slag As a Permanent Sequestration Sink for Carbon Dioxide", Steel Times International, DMG World Media, (2006), vol. 30(7), pp. 25/26, 28.
Goto, et al., "Eco-materials made from industrial by-products and carbon dioxide", AIP Conference Proceedings, American Institute of Physics, (2007), vol. 898(1), pp. 111-118.
Guzzon et al. Recycling of ladle slag in the EAF: Improvement of the foaming behaviour and decrease of the environmental impact, Revue De Metallurgie. Cahiers D'Informations Techniquest, (2007), vol. 104(4) pp. 171-178.

* cited by examiner

*Primary Examiner* — George Wyszomierski
*Assistant Examiner* — Tima M McGuthry Banks
(74) *Attorney, Agent, or Firm* — McCracken & Frank LLC

(57) ABSTRACT

Process for preparing a foaming slag former for electric furnaces comprising the steps of aggregating solid slag particles into a coarser granular material and carbonating the solid slag particles to form the foaming slag former. The solid slag particles are preferably aggregated before carbonization, so that the carbonates form a solid matrix binding the particles together.

23 Claims, 3 Drawing Sheets

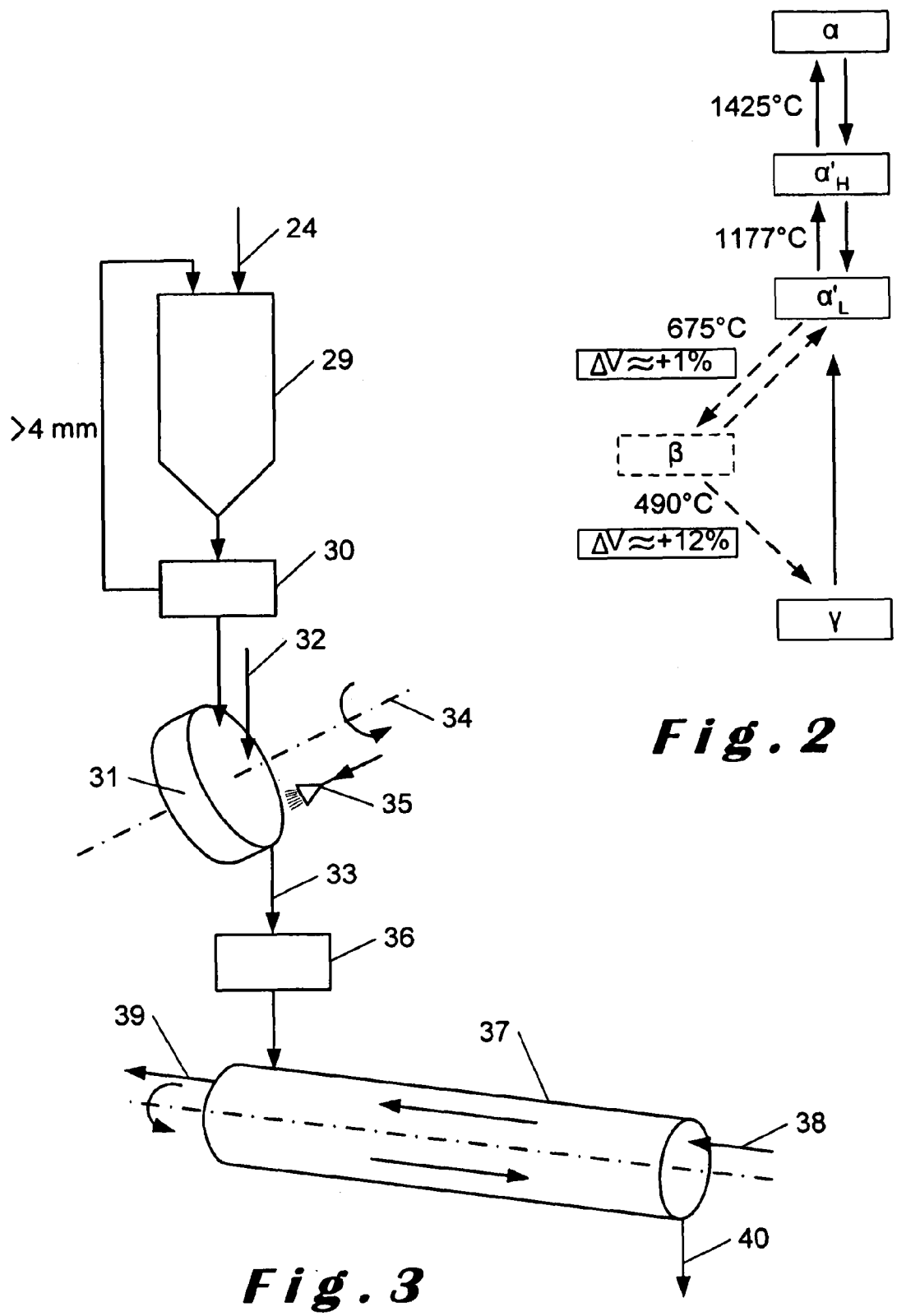

PROCESS FOR PREPARING A FOAMING SLAG FORMER, PRODUCT AND USE THEREOF

This application is a national stage entry of PCT Application No. PCT/EP2009/050445 filed Jan. 15, 2009, and claims the benefit of PCT Application No. PCT/EP2008/050412 filed Jan. 15, 2008, which is hereby incorporated by reference herein in its entirety.

The present invention relates to a process for preparing a foaming slag former for electric arc furnaces with at least 20 wt. % of solid slag particles, to the product of this process, and to its use in electric arc furnaces.

The use of electric arc furnaces is well-known in steelmaking as well as for the production of non-ferrous alloys. Typically, such an electric arc furnace comprises a refractory-lined vessel, and, within said vessel, a set of graphite electrodes. In such electric arc furnaces the charge is usually introduced at the beginning of a process cycle and melted down by an electric arc between the electrodes. Slag formers are usually added so as to create a layer of slag floating on the melt so as to protect the melt from oxidation. Additionally, the slag also acts as a thermal blanket, reducing heat losses, and helps protect the refractory lining from radiation from the electrodes.

Those slag formers usually comprise calcium and magnesium oxides.

To increase the thermal insulation and refractory lining protection provided by the slag, it has become common to use additives to foam said slag. Usually, these additives are carbon sources, such as coke, which, under the conditions of the hot furnace, produce carbon monoxide bubbles in the slag. It has been proposed, for instance in French patent application publication FR-A-2 634 787, Japanese patent application publication JP 62-023920, and U.S. Pat. Nos. 5,395,420 and 6,375,711 to use calcium and/or magnesium carbonates, that is, limestone, dolomite and magnesite, as both slag formers and carbon dioxide sources in the molten slag so as to foam it. This has however encountered the drawback that these natural carbonates are normally obtained from limestone, dolomitic limestone, dolomite and magnesite, raw materials of increasing cost.

At the other end of the process cycle, after discharging the electric arc furnace, the solid slag is a waste material. The disposal of that waste is a significant problem, in particular for slag containing pollutants such as heavy metals, e.g. chromium, nickel, or molybdenum, and/or halogens, e.g. fluorine, which could constitute a significant environmental and health hazard, should they leach out into the environment, and in particular into water supplies and/or the food chain. Moreover, this solid slag may still contain significant amounts of metal, which is thus lost to the production process. In particular, it is difficult to extract the finest metal inclusions from the solid slag. Furthermore, recycling the resulting fine metal dust by reintroducing it into the electric arc furnace has a low yield, as much of this fine dust is simply blown out of the furnace by the strong updraft.

It has been proposed by M. Guzzon et al in "Recycling of ladle slag in the EAF: improvement of the foaming behaviour and decrease of the environmental impact", 2006 ATS International Steelmaking Conference, Paris, France, Dec. 14-15, 2006, to introduce ladle slag powder into an electric arc furnace so as to recycle the slag powder and to thereby also improve at the same time the foaming behaviour. This effect is explained in the article by the introduction of dicalcium silicate particles which form suspended second-phase particles in the molten slag acting as CO nucleation sites, which leads to a high amount of favourable gas bubbles in the foamy molten slag.

However, this prior art still presents significant drawbacks. Because of the β-γ transition in such dicalcium-silicate-containing ladle slag, much of the slag is in a powdery form which hinders its introduction into the EAF. Apart from the obvious problem of blow-off of such fine particles by the strong updraft in these furnaces, these fine particles also tend to clog up chutes and trough lances.

The objectives of the present invention are therefore those of providing both a means of safe disposal of the solid slag, in particular its fine or powdery fraction, and a foaming slag former with reduced consumption of raw materials, including metal and/or metal ore and carbonate sources. In particular, the present invention addresses the problem of producing a slag former with better flowability and general handling.

These objectives are fulfilled by the steps of aggregating solid slag particles to form a granular material formed by coarser grains and carbonating them to produce said slag former. These coarser grains have much increased flowability with respect to the initial slag particles, which may be handled, transported and blown into an electric arc furnace without clogging up chutes, containers or ducts, or being blown off by the updraft. Aggregating the particles into coarser grains also increases the homogeneity of the product and thus its safety and effectiveness in use.

Preferably, said aggregation step may be performed before said carbonation step, so that, after the carbonation step, a solid matrix comprising carbonates formed during the carbonation step binds the slag particles together within each grain. This matrix produces a hard granular material which is particularly easy to handle without necessarily requiring any binding additive. Moreover, it may form a crust around the grain which prevents water absorption, thus further increasing the safety of the granular material as a foaming slag former.

While the recycling of ladle slag disclosed in the above-mentioned prior art article of M. Guzzon et al. increases the amount of nucleation sites and thus produces a finer, more distributed foam with a smaller bubble size, it does not significantly contribute to the volume of gas released in the molten slag, for the following reasons:

The ladle slag can absorb a lot of water, which presents a clear explosion hazard during their introduction in the EAF, as any water absorbed by the particles instantly vaporises. To prevent this, in the disclosed prior art method, the ladle slag powder is used while still fresh, before any significant hydration of the calcium and magnesium oxides, never mind carbonation of the resulting hydroxides, can take place. The natural hydration of calcium and magnesium oxides, an intermediate step for the carbonation, is in fact explicitly discouraged in said prior art article. In the disclosed prior art method, the ladle slag is thus substantially free of carbonates.

It is thus a further objective of the present invention to increase the volume of gas released in the molten slag to form foam. To this purpose, at least 2 wt. % more preferably at least 3 wt. % of carbonates (expressed as $CO_3^{2-}$) are produced during the carbonation step (measured on the basis of the total dry weight of the foaming slag former). For instance, said carbonation may be carried out with a gas, such as for example a flue gas, comprising at least 5 vol. %, preferably at least 8 vol. % and more preferably at least 10 vol. % of carbon dioxide.

By the carbonation step, calcium and magnesium oxides/hydroxides present in the solid slag particles are homogeneously converted into calcium and magnesium carbonates, which in the furnace will decompose into calcium and magnesium oxides and foam-inducing carbon dioxide. The exothermic carbonation in an atmosphere with a high content of carbon dioxide also dries the slag and reduces its water absorption, significantly increasing the safety of its use as a foaming slag former. By recycling the solid slag into a highly carbonated slag former, the consumption of costly raw materials, such as limestone, dolomitic limestone, dolomite, magnesite, scrap metal and/or metal ore, is reduced, all the while reducing the problem of disposing with a potentially hazardous waste. This slag former is also sulphur-poor, which makes it comparable to the highest-quality natural carbonate sources.

Carbonating with industrial flue gases moreover provides an advantageous use to carbon dioxide that normally would otherwise be directly emitted into the atmosphere as a greenhouse gas. It must be noted that this carbon dioxide is thus continuously recycled, rather than permanently stored, as proposed by C. H. Rawlins et al in "Steelmaking slag as a permanent sequestration sink for carbon dioxide", pp. 25,26, 28, Steel Times International October 2006, or by S. Goto in "Eco-Materials Made From Industrial By-Products and Carbon Dioxide", Water Dynamics: 4th International Workshop on Water Dynamics.

Advantageously, said carbonation step may be performed using a gas comprising less than 30 vol. %, preferably less than 25 vol. % and more preferably less than 20 vol. % of carbon dioxide. This allows the use of industrial flue gases without any particular treatment for this carbonation step.

Advantageously, said carbonation step may be performed at a temperature of between 10 and 100° C., in particular at a temperature lower than 80° C., and more particularly at a temperature lower than 60° C. Again, this allows the use of industrial flue gases without any significant addition of thermal energy.

Advantageously, said carbonation step may be performed at a pressure lower than 10 bar and preferably substantially at ambient pressure. Not only this dispenses with potentially expensive high-pressure equipment, but the comparatively slow carbonation at these pressures has surprisingly been found to produce a granular material with harder grains. Presumably, the low pressure promotes crystal growth instead of crystal nucleation, this latter being known to give rise to very small carbonate crystals characterised by poor binding properties.

Preferably, after said carbonation said gas may still be used to reduce the alkalinity of effluent waters having a pH higher than 11. Handling steel slag (for example for cooling the steel slag or when washing or sieving the crushed steel slag) often produces, as a waste product, such highly alkaline effluent waters, with a high content in calcium, sodium, potassium and/or magnesium ions. Bubbling this gas through such effluent waters will further reduce its carbon dioxide content, while simultaneously reducing their alkalinity, reducing the environmental impact of both.

Preferably, said slag particles may have sizes not larger than x, said x being not larger than 4 mm, preferably not larger than 3 mm, more preferably not larger than 2 mm, and most preferably not larger than 1 mm. Such a small particle size increases the reaction surface and facilitates the carbonation of the slag particles.

Preferably, said grains may have sizes not smaller than y, said y being not smaller than 1 mm, and more preferably not smaller than 2 mm.

A binder, such as cement, may additionally be added during and/or before said aggregation step to help bind the slag particles together into the coarser grains. This ensures the cohesion of the grains during their handling in particular when they are not, or not yet, bound together by a solid matrix containing carbonates formed during the abovementioned carbonation.

Preferably, said grains may preferably also contain sand, in particular sea sand. Otherwise, carbonation could form a gas-impervious crust of carbonate around each grain, thus trapping moisture within each grain which could cause the grains to explode during the introduction in the furnace. By adding such sand to the slag particles during the aggregation step and disrupting the packing of the slag particles, it is possible to produce granules with increased gas permeability, improving both the carbonation of the slag particles at the core of each grain and the evaporation of moisture from each grain prior to their introduction in the furnace. Moreover, this sand also serves as a source of silicon, and, in the case of sea sand, accelerates the hydration of calcium and magnesium oxides prior to their carbonation.

Preferably, said grains may also contain carbonaceous particles, such as, for example coal and/or coke dust. Since the calcination of calcium and magnesium carbonates into calcium, magnesium and carbon oxides is a strongly endothermic reaction, the exothermic combustion of these carbonaceous particles will help restore the energy balance in the electric arc furnace, besides being an additional source of slag foaming gas. Coal and coke dust also have the advantage of being inexpensive byproducts of, respectively, coal mining and handling and coke production.

Preferably, said grains may also contain bauxite particles. Because they are a source of aluminium, bauxite particles not only can disrupt the packing of the slag particles and thus decrease the gas permeability of the grains, but also have the additional advantage of improving the retention of halogens, such as fluorine, in the foaming slag after it cools and hardens. Moreover, bauxite having a lower melting point than sea sand, the energy consumption of the electric arc furnace could be comparatively lower.

Preferably, said grains may also contain stone crushing sands and/or dust. Such waste product of quarries, in particular of limestone, dolomitic limestone, dolomite and/or magnesite quarries, besides disrupting the packing of the slag particles, can also be an additional source of calcium and/or magnesium carbonates at a low cost.

Preferably, said grains may also contain glass particles. Besides disrupting the packing of the slag particles, these glass particles, like bauxite, also have the advantage of having a comparatively low melting point. Moreover, they provide a means of adjusting the alkalinity of the foaming slag, and can be obtained as a cheap waste product from glass recycling processes.

Preferably, said slag particles may contain a significant amount of $\gamma$-dicalcium silicate, in particular at least 3 wt. %, preferably at least 5 wt. % and more preferably at least 7 wt. % of $\gamma$-dicalcium silicate. While other uses for solid slag are already known, in particular in the construction industry, disposal of slag particles containing a significant amount of $\gamma$-dicalcium silicate has proven particularly complicated until now, due to their negative properties of water absorption. Slag containing $\gamma$-dicalcium silicate can absorb large quantities of water.

At ambient temperature, crystalline lime-silicate slag generally comprises crystals of dicalcium silicate $(CaO)_2SiO_2$ in both their $\beta$ and $\gamma$ polymorphic states. As molten dicalcium silicate slowly cools down and solidifies, it goes through several polymorphic forms:

$\alpha$ with hexagonal crystal structure, $\alpha_H'$ with orthorhombic crystal structure, $\alpha_L'$ with orthorhombic crystal structure,
β with monoclinic crystal structure, and
γ with orthorhombic crystal structure.

As the last transition is linked to an increase of approximately 12% in volume, it causes high strains and microcracks in the dicalcium silicate crystals of the orthorhombic γ polymorphic state. These microcracks explain the disadvantageous water absorption properties that had been found hitherto in slag containing γ-dicalcium silicate, as water is absorbed by capillarity into them.

The increase in volume in the transition from the β polymorphic state to the γ polymorphic state not only causes microcracks but even grain fracture and separation. As a result, the fine fraction of the slag will be disproportionately rich in comparatively soft γ-dicalcium silicate. Due to the abovementioned microcracks and the associated capillarity, this fine fraction of the slag will have a water absorption capacity of over 20%. Moreover, it can retain this water for longer periods of time.

Advantageously, said slag particles may be from stainless steel slag. Stainless steel slag usually contains substantial amounts of heavy metals such as chromium, in particular chromium VI in the form of $CrO_4$ and $Cr_2O_7$ and molybdenum, which constitute a significant environmental and public health problem. By recycling as large a proportion of this slag back into the furnace, this problem can be significantly alleviated.

The present invention also relates to a foaming slag former for electric arc furnaces prepared according to the process of the invention, and to the use of such a foaming slag former in an electric arc furnace. Said foaming slag former may be introduced into said electric arc furnace through at least one chute and/or at least one trough lance, with the advantage of ensuring an even distribution of the slag within the furnace.

When weight percentages are given in the present specification, these are percentages in dry weight.

A particular embodiment of the invention will now be described illustratively, but not restrictively, with reference to the following figures:

FIG. 2 is a diagram representing the phase transitions during the cooling of dicalcium silicate;

FIG. 3 is a schematic diagram representing a particular embodiment of the process of the invention.

Figure 1:
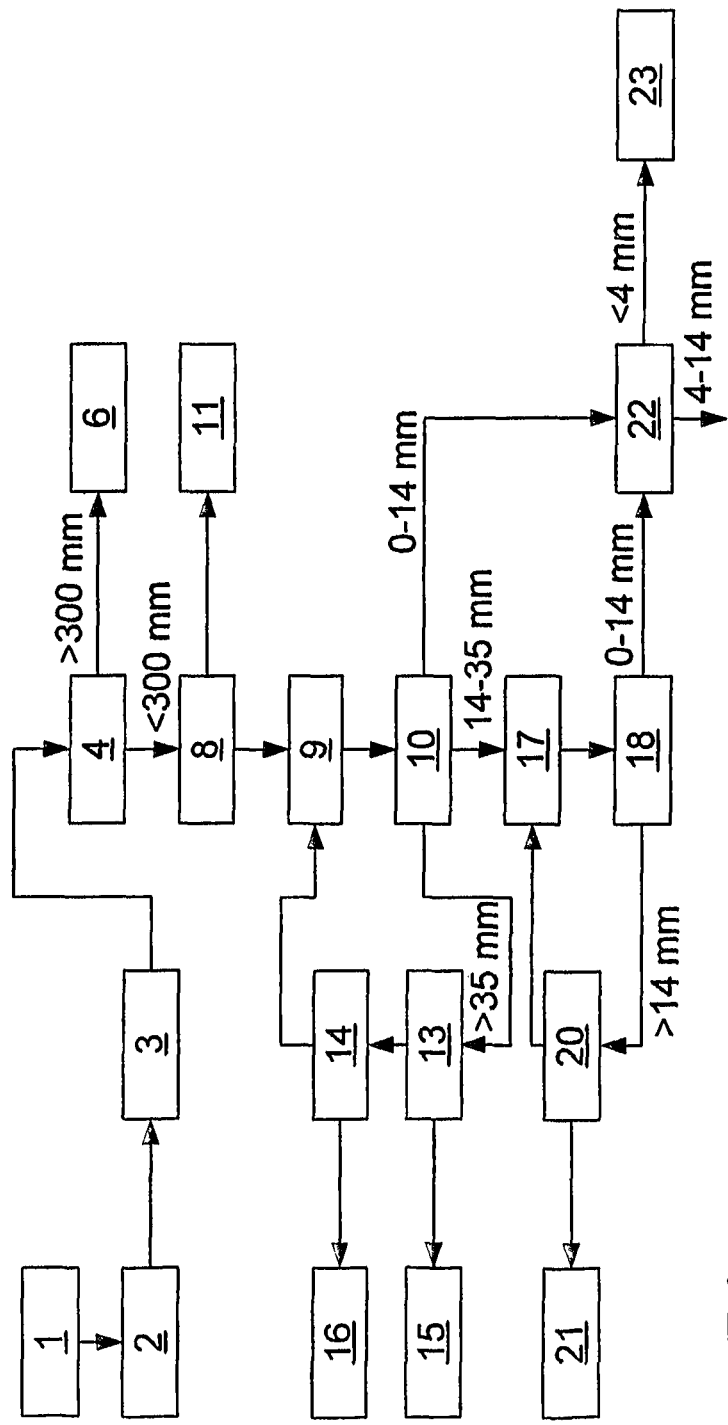
FIG. 1 is a flow chart representing a process for separating a fine stainless steel slag fraction for use with a particular embodiment of the process of the invention.

FIG. 1 illustrates a process for separating a fine fraction of stainless steel slag particles. This fine fraction is rich in γ-dicalcium silicate, and presents water absorption properties that normally prevent it being used in mixtures with hydraulic binding agents, such as Portland cement. In this separation process, the molten lime-silicate slag of an electric arc furnace 1 for stainless steel production is emptied in buckets 2, and transported in these buckets 2 to cooling pits 3, in which it is left to slowly cool and solidify. As the cooling is comparatively slow, the slag will not solidify nearly entirely in an amorphous phase, like GBFS (granular material blast furnace slags), but to a large extent in crystalline phases instead. A significant component of lime-silicate slag is dicalcium silicate $(CaO)_2SiO_2$. As crystalline dicalcium silicate cools down, it goes through several polymorphic forms as illustrated in FIG. 2:

α with hexagonal crystal structure,
$\alpha_H'$ with orthorhombic crystal structure,
$\alpha_L'$ with orthorhombic crystal structure,
β with monoclinic crystal structure, and
γ with orthorhombic crystal structure.

With pure dicalcium silicate under laboratory conditions, the transition from $\alpha_L'$-dicalcium silicate to β-dicalcium silicate will occur at 675° C., then to be followed by the transition from β-dicalcium silicate to γ-dicalcium silicate at 490° C. As the transition from β-dicalcium silicate to γ-dicalcium silicate involves an increase of 12% in volume due to their different crystal structure, it will break up the dicalcium silicate crystals. This pulverizes a fraction of the slag. The transition also causes microcracks in the fine γ-dicalcium silicate grains, which appears to explain why this fine dust can absorb and retain large quantities of water. These water absorption properties make this fine γ-dicalcium silicate dust highly unsuitable for most uses in construction.

Since even with the adjunction of chemical stabilisers and other measures known to the skilled person, it appears very difficult to completely prevent the formation of γ-dicalcium silicate in mainly crystalline lime-silicate slag, and since in any case these measures could interfere with the economical operation of the furnace 1, it has been proposed to extract a fine fraction of the slag, since, due to the pulverisation linked to the γ-β transition, this fine fraction is disproportionately rich in γ-dicalcium silicate.

In the process illustrated in FIG. 1, molten slag is extracted from the stainless steel furnace 1 and brought to cooling pits 3. After cooling, the solidified slag will be dug from these cooling pits 3 and fed through a hopper 4. The hopper 4 comprises a grid for stopping all oversized slag pieces 6, in this particular case those bigger than 300 mm. As oversized pieces could damage the crushers used in the later process, these oversized pieces 6 are removed for later particular treatment, such as breaking with hammers and extraction of large metal fragments before being fed again through the hopper 4.

The slag particles smaller than 300 mm fall through the hopper 4 onto a first conveyor belt. This first conveyor belt then transports them through a first metal handpicking cabin 8 to a first crusher 9 and a first sieve 10. In the metal handpicking cabin 8, operators remove large metal pieces 11 from the slag particles on the conveyor belt. After the slag particles are crushed in the first crusher 9, they go through the first sieve 10 which separates them into three fractions: particles bigger than 35 mm, particles between 14 and 35 mm and particles smaller than 14 mm. The fraction of particles bigger than 35 mm is taken by a second conveyor belt through a second metal handpicking cabin 13 and a first metal separating magnetic belt 14, where more metal pieces 15 and 16 are removed. The particles bigger than 35 mm are then put back into the first crusher 9. The fraction of particles between 14 and 35 mm goes into a second crusher 17 and a second sieve 18, where after being crushed again it is separated into two fractions: a fraction of particles smaller than 14 mm and a fraction of particles bigger than 14 mm. The fraction of particles bigger than 14 mm is taken by a third conveyor belt through a second metal separating magnetic belt 20, where more metal 21 is removed, and back into the second crusher 17.

The fraction of particles smaller than 14 mm from the first sieve 10, and the fraction of particles smaller than 14 mm from the second sieve 18 join again and are put together through the third sieve 22, which separates them into a fraction 23 of particles smaller than 4 mm and a fraction of particles between 4 and 14 mm, this coarser fraction being suitable for use, for example, in construction materials.

Within the fraction 23 of particles smaller than 4 mm, a fine fraction 24 of particles smaller than 0.5 mm is particularly rich in γ-dicalcium silicate, and is therefore used in a particular embodiment of the process of the invention, illustrated in FIG. 3.

In this process, the particles in said fine stainless steel slag fraction 24 are first aggregated to form a coarser granular material 33 with a granulometry between 0 and 4 mm, and then carbonated. However, since the particles in the fine fraction 24 can form large clods during storage, in particular in the open, in this particular embodiment, a first breaking up step is carried out to break up those clods before the aggregation step. For this purpose, this fine fraction 24 is dried, then fed through a hopper 29 into a rotary harrow 30, and sieved to remove any remaining clods larger than 4 mm, which are then fed back into the hopper 29.

After this breaking up step, the fine fraction 24 is fed into a disc or pan pelletizer 31, in which the slag particles of the fine fraction 24, together with sea sand 32, are aggregated into a coarser granular material 33 by the rotation of an inclined disc or pan around its main axis 34. Water 35 is sprayed onto the pelletizer 31 for the aggregation of the slag particles. For this, highly alkaline effluent waters from the previous slag treatment steps may be used.

Besides the slag particles of the fine fraction 24, it could also be contemplated to add other materials into this granular material 33, alternatively or in combination to the sea sand 32, for instance a carbonaceous material, such as coal or coke dust, bauxite particles, stone crushing sands and/or dust, glass particles, and/or lime dust. The granular material should however contain at least 20 wt. %, preferably at least 50 wt. % and more preferably at least 75 wt. % of solid slag particles.

Fresh steel slag usually contains calcium and magnesium oxides, CaO and MgO. For a more complete carbonation of the slag, these oxides can be hydrated to convert them into carbonatable calcium and magnesium hydroxides, $Ca(OH)_2$ and $Mg(OH)_2$. In this particular embodiment, the fine fraction 24 is stored in the open for some time before the aggregation and carbonation steps, so that at least a partial hydration happens naturally due to ambient moisture. If the fine steel slag fraction is however so fresh that it has not yet been substantially hydrated by the ambient moisture, it may be advantageous to also dissolve other additives, such as calcium and/or magnesium acetate and/or salts, such as, in particular, calcium chloride, in the water 34, or to hydrate the warm slag (under 350° C.) in a steam chamber or autoclave in order to accelerate this hydration reaction. Tables 1 to 4 show the results of hydration tests on calcinated (and thus substantially calcium and magnesium hydroxide-free) samples of the fine fraction 24:

TABLE 1

Hydration with 20 wt. % pure water

| Hydration time [min] | $Mg(OH)_2$ [wt. %] | $Ca(OH)_2$ [wt. %] | Total hydroxides [wt. %] |
|---|---|---|---|
| 43 | 0.00 | 0.00 | 0.00 |
| 236 | 0.00 | 0.00 | 0.00 |
| 514 | 0.08 | 0.14 | 0.22 |
| 3000 | 0.11 | 0.10 | 0.21 |

TABLE 2

Hydration with 20 wt. % of an aqu. solution of 0.5 M Mg acetate

| Hydration time [min] | $Mg(OH)_2$ content [wt. %] | $Ca(OH)_2$ content [wt. %] | Total hydroxides [wt. %] |
|---|---|---|---|
| 105 | 0.89 | 0.47 | 1.20 |
| 320 | 0.78 | 0.63 | 1.41 |
| 1080 | 0.73 | 0.32 | 1.23 |
| 2653 | 0.86 | 0.40 | 1.26 |
| 4379 | 0.76 | 0.53 | 1.30 |

TABLE 3

Hydration with 20 wt. % of an aqu. solution of 0.5 M Ca acetate

| Hydration time [min] | $Mg(OH)_2$ content [wt. %] | $Ca(OH)_2$ content [wt. %] | Total hydroxides [wt. %] |
|---|---|---|---|
| 86 | 1.34 | 0.08 | 1.42 |
| 163 | 1.09 | 0.80 | 1.89 |
| 829 | 1.07 | 1.01 | 2.08 |
| 1276 | 1.11 | 0.89 | 2.00 |
| 1914 | 1.02 | 0.91 | 1.93 |

TABLE 4

Hydration with 20 wt. % of an aqu. solution of 0.5 M $CaCl_2$

| Hydration time [min] | $Mg(OH)_2$ content [wt. %] | $Ca(OH)_2$ content [wt. %] | Total hydroxides [wt. %] |
|---|---|---|---|
| 84 | 0.00 | 0.00 | 0.00 |
| 776 | 0.00 | 0.61 | 0.61 |
| 1464 | 0.30 | 0.87 | 1.17 |
| 3113 | 0.16 | 0.72 | 0.88 |

As can be seen from these results, such additives, dissolved in aqueous solutions can significantly accelerate the hydration of calcium and magnesium oxides to form hydroxides in the fine steel slag fraction 24. It must also be noted that the sodium chloride present in the sea sand 32 also helps accelerate the hydration of the magnesium and/or calcium oxides present in the particles of the fine steel slag fraction 24.

If the rotation speed and inclination of the pelletizer 31 are kept constant, the grain size of the coarser granular material 33 obtained in this aggregation step can be roughly controlled by regulating the flow of water 35 and the stay time of the slag particles in the pelletizer 31. After being removed from the pelletizer 31, the granular material 33 is fed into sieve 36 to remove oversize grains, in this particular embodiment those over 8 mm. Eventually, a fine sieve could also be used to remove undersize grains, for instance those under 1 mm.

In the next step, this coarser granular material 33 is carbonated, so as to form calcium and magnesium carbonates $CaCO_3$, $MgCO_3$ and $CaMg(CO_3)_2$. In a particular embodiment, this carbonation step may be carried out in a continuous manner, for instance within an inclined rotating drum 37 with a flue gas supply 38, and a flue gas exhaust 39. The granular material 33 is conveyed by gravity against the flow of flue gas in the drum 37. Said flue gas may be provided by, for instance, an incinerator, a power plant, a blast furnace or a cement kiln, at substantially atmospheric pressure and a temperature of around 50° C., with about 10% vol. $CO_2$. The carbonation time can be regulated by the dimensions of the drum 37, its inclination and/or its rotation speed. It has been found that a substantial level of carbonation may be achieved in as little as 10 minutes. Although in this particular embodiment the carbonation is carried out continuously, alternatively it would also be possible to carry out batch carbonation instead.

The sea sand 32, and/or other additional particles, through their different particle size and shape, disrupt the packing of the slag particles in each grain of the granular material 33, which increases its gas permeability to, for example, $1 \cdot 10^{-6}$ m/s, by interconnecting the pores in the grain without significantly increasing the total pore volume. As a result, the carbon dioxide can more easily reach the core of each grain, contributing to a more complete carbonation. Moreover, this porosity will also ensure that the carbonates, while binding the slag and sand particles together, will not form a continuous, impervious crust on the surface of each grain. Since the carbonation reaction is exothermic, the resulting heat will evaporate the internal moisture of the granular material 33 at least partially, resulting in a dry carbonated granular material 40 more suitable for use in electric arc furnaces. If the granular material is still not dry enough directly after the carbonation, it may still be left in cold or heated storage to dry out more completely. Given the elevated temperature of electric arc furnaces, at around 1500-1650° C., the introduction therein of a granular material 33 having a moisture content of even as little as 0.2 wt. % could result in a sudden and explosive vaporisation of this moisture, which would be both a safety hazard and highly damaging for the components of the electric arc furnace, such as its refractory lining. Usually, however, a moisture content under 1 wt. % is considered safe.

The flue gas exiting the rotating drum 37 through the flue gas exhaust 39 still contains a significant amount of carbon dioxide. Since highly basic process water, with a pH value which can exceed 11 or even 12, may be effluent, for instance, from the previous crushing and washing of the steel slag, this flue gas can still be used to neutralise such effluent process water.

Figure 4:
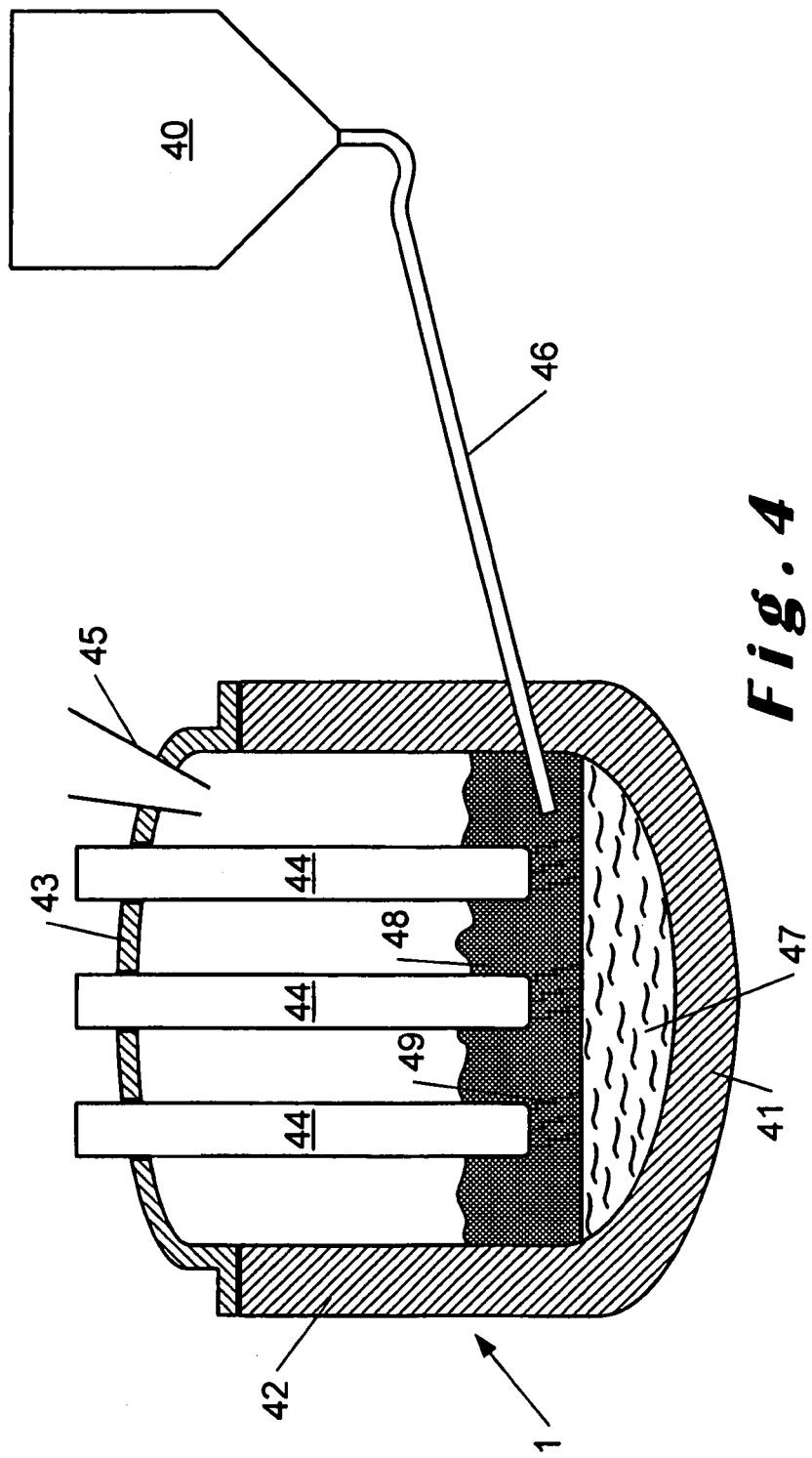
FIG. 4 is a schematic diagram of an electric arc furnace wherein a foaming slag former according to the invention may be used.

Turning now to FIG. 4, the carbonated granular material 40 is suitable for use as a foaming slag former back in the electric arc furnace 1. The illustrated electric arc furnace 1 comprises refractory-lined hearth 41 and walls 42, a lid 43 and graphite electrodes 44, wherein the lid 43 comprises a chute 45, and a trough lance 46 traverses the refractory-lined walls 42. In use, the electric arc furnace 1 contains a melt 47 and slag 48, heated by electric arcs 49. To foam the slag 48, the carbonated granular material 40 may be introduced into the electric arc furnace 1 through the chute 45 and/or blown into the electric arc furnace 1 through a trough lance 46. Since, at around 1500° C. to 1650° C., the temperature in the electric arc furnace 1 is well above the calcination temperatures of the calcium and magnesium carbonates in the granular material 40, these break down into calcium and magnesium oxides, on one hand, and carbon dioxide, on the other. This carbon dioxide forms bubbles in the slag 48, foaming it.

To increase the foam formation, and to at least partially offset the energy spent in the endothermic calcination of the carbonates in the granular material, carbonaceous materials such as, for example, coke or coal, may also be introduced into the electric arc furnace through the chute 45 and/or the lance 46. Moreover, these carbonaceous materials may be, as described above, incorporated within the grains in the carbonated granular material 40, and/or separate from the carbonated granular material 40. In stainless steel production, the introduction of carbonaceous materials, acting as reducers, also has the advantage of preventing to some extent the formation of chromium oxides, reducing the consumption of chromium as well as the content of environmentally problematic chromium (VI) in the slag 48.

The foamed slag 48 helps protect the refractory lining of the electric arc furnace 1 from electric arc radiation, forms a more efficient thermal blanket over the melt, reducing heat losses, and dampens the noise from the electric arc furnace 1. Once discharged, this slag 48 may be reprocessed again according to the processes illustrated in FIGS. 1 and 3.

Although the present invention has been described with reference to specific exemplary embodiments, it will be evident that various modifications and changes may be made to these embodiments without departing from the broader scope of the invention as set forth in the claims. For instance, the fine slag particles may be left to naturally hydrate and carbonate, aggregating themselves into a larger block (heap), which is then broken up to produce the granular foaming slag former. The aggregation step may also be carried out by other means than the disc or pan pelletizer described hereabove, such as, for instance, a pelletising press. Lime dust, a byproduct of lime production, could also added to the slag particles, both as an inexpensive additional source of carbonatable calcium and/or magnesium hydroxides after hydration, and to disrupt the packing of the slag particles in a granular material. The duration of the carbonation may be adjusted according to the circumstances, and the carbonation be carried out using different equipment than the rotating drum described hereabove. Also, the invention may be applied in the production of steels other than stainless steel, or even of non-ferrous alloys in which electric arc furnaces are used. Accordingly, the description and drawings are to be regarded in an illustrative sense rather than a restrictive sense.

The invention claimed is:

1. Process for preparing a foaming slag former (40) for electric arc furnaces (1), with at least 20 wt. % of solid slag particles, characterised in that it comprises the steps of: aggregating said solid slag particles to form a granular material formed by coarser grains, and carbonating said solid slag particles, after being aggregated in said aggregating step, to produce said slag former (40).

2. Process according to claim 1, wherein during said carbonating step at least 2 wt. % of carbonates are produced.

3. Process according to claim 1, wherein said carbonating is carried out with a gas comprising at least 5 vol. % of carbon dioxide.

4. Process according to claim 3, wherein said gas comprises less than 30 vol. % of carbon dioxide.

5. Process according to claim 3, wherein said carbonating step is performed at a temperature of between 10 and 100° C.

6. Process according to claim 3, wherein said carbonating step is performed at a pressure lower than 10 bar.

7. Process according to claim 3, wherein after said carbonating said gas is used to reduce alkalinity of an effluent water having a pH higher than 11.

8. Process according to claim 1, wherein said slag particles have sizes not larger than x, said x being not larger than 4 mm.

9. Process according to claim 1, wherein said coarser grains have sizes not smaller than y, said y being not smaller than 1 mm.

10. Process according to claim 1, wherein a binder is added during and/or before said aggregating step to help bind the slag particles together into the coarser grains.

11. Process according to claim 1, wherein said granular material contains sand (32).

12. Process according to claim 1, wherein said coarser grains contain carbonaceous particles.

13. Process according to claim 1, wherein said coarser grains contain bauxite particles.

14. Process according to claim 1, wherein said coarser grains contain stone crushing sands and/or dust.

15. Process according to claim 1, wherein said coarser grains contain glass particles.

16. Process according to claim 1, wherein said slag particles contain a significant amount of γ-dicalcium silicate.

17. Process according to claim 1, wherein said slag particles are from stainless steel slag.

18. Process according to claim 1, wherein said aggregating step comprises aggregating said solid slag particles into a block and then, after said carbonating step, breaking up said block to produce said granular material.

19. Process according to claim 1, wherein said slag particles contain at least 3 wt. % of γ-dicalcium silicate.

20. Foaming slag former (40) for electric arc furnaces (1) prepared according to claim 1, wherein the foaming slag former (40) comprises carbonated solid slag particles aggregated to form a granular material formed by coarser grains.

21. Method of forming a slag on a melt in an electric arc furnace (1), said method comprising adding a foaming slag former (40) prepared according to claim 1 to said electric arc furnace (1).

22. Method according to claim 21, wherein said foaming slag former (40) is introduced into said electric arc furnace (1) through at least one chute (45) and/or at least one trough lance (46).

23. Method according to claim 21, wherein said foaming slag former (40) is introduced into said electric arc furnace (1) concurrently with a carbonaceous material.

\* \* \* \* \*